United States Patent [19]

Peterson et al.

[11] 4,232,563

[45] Nov. 11, 1980

[54] LAMINATED ELASTOMERIC END BEARINGS FOR ARTICULATING LINKS

[75] Inventors: Robert R. Peterson, Hudson; Daniel S. Ventura, Malden; Richard S. Gureghian, Burlington, all of Mass.

[73] Assignee: Barry Wright Corporation, Watertown, Mass.

[21] Appl. No.: 887,204

[22] Filed: Mar. 16, 1978

[51] Int. Cl.² ............ G05G 25/00; F16C 11/08
[52] U.S. Cl. ............................ 74/470; 248/635; 403/157; 403/228; 416/114
[58] Field of Search ............ 74/470, 60; 248/589, 248/74 R, 605, 634, 635, 611, 612; 403/157, 224, 225, 227, 228; 416/114

[56] References Cited

U.S. PATENT DOCUMENTS

| 1,780,724 | 11/1930 | Short | 403/224 |
|---|---|---|---|
| 2,028,550 | 1/1936 | Lord | 248/605 |
| 2,028,551 | 1/1936 | Lord | 248/589 X |
| 2,179,959 | 11/1939 | Schroedter | 403/224 |
| 2,270,673 | 1/1942 | Lord | 248/614 X |
| 2,287,608 | 6/1942 | French | 403/225 X |
| 2,515,360 | 7/1950 | Vail | 403/228 X |
| 3,841,586 | 10/1974 | Broadley et al. | 74/60 X |

FOREIGN PATENT DOCUMENTS

| 558476 | 1/1944 | United Kingdom . |
| 807423 | 1/1959 | United Kingdom . |
| 1129157 | 10/1968 | United Kingdom . |
| 1243821 | 8/1971 | United Kingdom . |

Primary Examiner—Allan D. Herrmann
Attorney, Agent, or Firm—Milton E. Gilbert

[57] ABSTRACT

End bearing assemblies are provided for articulating links, especially for articulating control links associated with helicopter rotor mechanisms. The end bearing assemblies comprise at least two elastomeric bearing sections connected by a load-transmitting member and arranged to react to loadings and accommodate motions along and about at least one of three mutually orthogonal axes.

52 Claims, 12 Drawing Figures

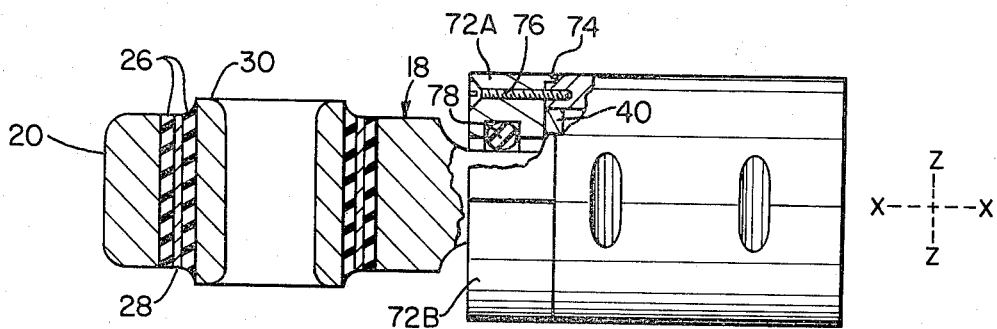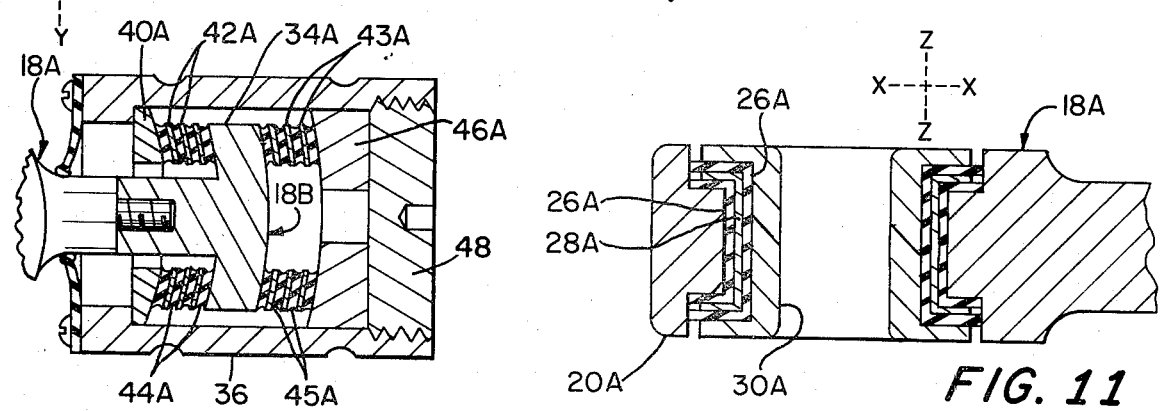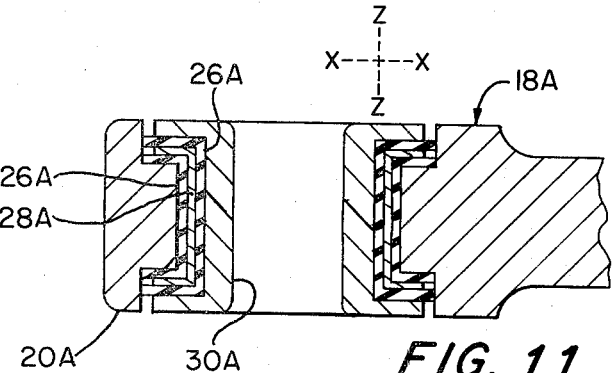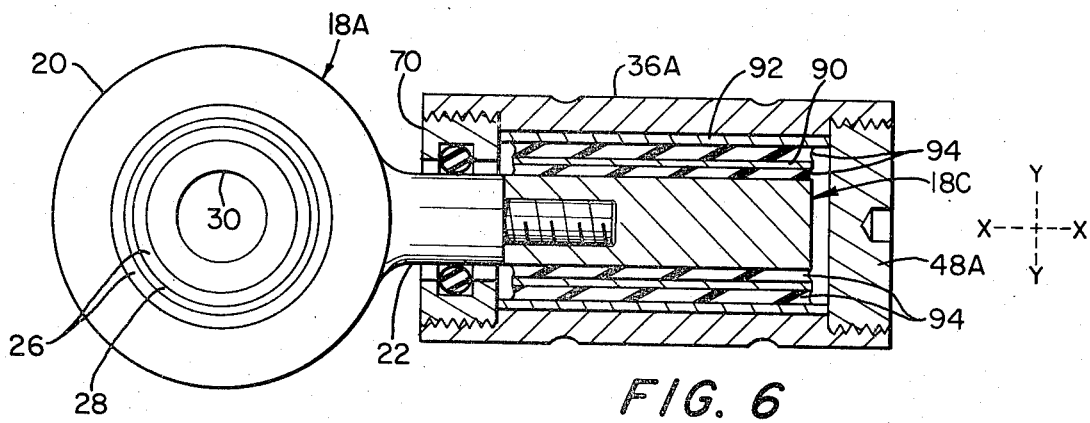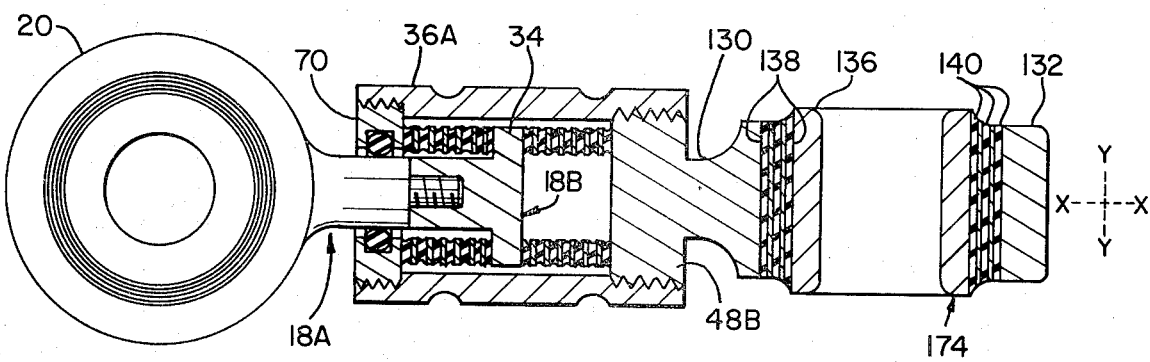

LAMINATED ELASTOMERIC END BEARINGS FOR ARTICULATING LINKS

This invention relates to laminated elastomeric bearings and the purpose is to improve the design of bearing connections of articulating links associated with helicopter rotor assemblies.

Conventional helicopter rotor assemblies generally have a complex construction characterized by a number of articulately connected control and operating members. The articulations vary with respect to the loads and motions to which they are subjected and as a consequence they are frequently a contributory cause, and sometimes a primary cause, of helicopter failure or inoperability. A particular problem area is trunnions which serve as articulate connections between a combined rotor swash plate/scissors and sleeve assembly and links connecting that combined assembly to other components. As is known to persons skilled in the art, a typical swash plate assembly has an inner swash plate which is connected by control links to the cyclic control system and an elevator control system, and an outer swash plate that is connected by links to a scissors and sleeve assembly that is connected by links to a collective control system and also to an upper linkeage that rotates with the main rotor. The cyclic control system provides fore-aft and lateral flight control while the collective control system determines vertical movement. Heretofore the trunnions (also commonly known as rod end bearings since often the links are simple rods) have taken the form of all metal bearing units. The all-metal end bearings frequently exhibit premature failure characteristics due to inability to withstand the operating load-motion environment which usually involves high static and dynamic loading with superimposed oscillatory motion relative to one or more of three mutually orthogonal axes. A primary concern is the potential of catastrophic helicopter failures as a consequence of sudden seizing of a metal bearing. Metal rod end bearings are costly to maintain and install since provision must be made to keep them adequately lubricated (usually by way of a lubrication sub-system embodied in the rotor assembly).

Accordingly, the primary object of this invention is to provide new trunnions or rod end bearings for swash plate and collective scissors and sleeve assemblies which offer a number of advantages over conventional metal rod end bearings, including increased service life, high reliability, simplified installation (no lubrication sub-systems are required), and a slow, gradual failure mode instead of a sudden potentially catastrophic failure.

Another important object is to provide new and improved rod end bearings for swash plate assemblies and other mechanisms having the capability to operate satisfactorily for long periods in a load-motion environment where they are subjected to static and dynamic or oscillatory loading with superimposed motion along or about one, two or all of three mutually orthogonal axes.

A further object is to provide new and improved bearing assemblies which can be designed to accomodate different loadings along selected axes.

These and other objects are achieved by providing bearing assemblies which comprise first and second laminated elastomeric bearing sections arranged to accomodate loadings and motions along or about selected orthogonally disposed axes, with the first bearing section having a first tubular load-transmitting member, and an elongate load-transmitting member extending within and attached to said first tubular member by a laminated elastomer bearing structure, and the second bearing section having a second tubular load-transmitting member attached to said elongate load-transmitting member by a laminated bearing structure. Other features and many of the attendant advantages of the invention are disclosed or made obvious by the following detailed description which is to be considered together with the drawings wherein:

FIGS. 4–12 are sectional views of other embodiments and modifications of the invention, with FIGS. 8 and 9 illustrating preferred forms of the invention.

In the several views like parts are identified by like numerals, unless indicated otherwise.

It is well known that the compressive load carrying ability of a given thickness of an elastomer material may be increased many times by subdividing it into a plurality of layers and separating the layers by intervening layers of a non-extensible material. At the same time, however, the ability of the resilient material to yield in shear or torsion in a direction parallel to the layers is substantially unaffected. This concept has been adopted or utilized in the design of different forms of laminated bearings, as exemplified by French Pat. No. 934336 and the following U.S. Pat. Nos.: Schmidt, 3,679,197; Boggs, 3,377,110; Orain, 2,995,907; Hinks 2,900,182; Wildhaber, 2,752,766; Ballaver, 3,200,887; Mosinskis, 3,501,250; and Pascher, 3,790,302. Laminated bearings of various types are commonly used in commercial applications where it is necessary to carry large compressive loads in a first direction and also to accommodate limited relative movement in other directions. The bearings are designed so that the large compressive loads are carried generally perpendicular to the resilient lamellae. A significant commercial variety of bearings is characterized by the alternating bonded lamellae being disposed concentrically about a common center, i.e., so that successive alternating layers of resilient and non-extensible materials are disposed at successively greater radial distances from the common center. This variety of bearings includes a number of different configurations, notably bearings which are cylindrical, conical or generally spherical in shape or which are essentially sectors of cylinders, cones and spheres. Such bearings typically are used in helicopters as rotor shaft supports. Another form of laminated bearing consists of a stack of annular non-extensible metal laminates adhered together by alternating annular layers of rubber. By way of example, this form of elastomeric bearing has been used in helicopters as a torsional restraint to resist centrifugal forces in rotor blade feathering and flapping hinge assemblies. As demonstrated by the following detailed description the present invention extends application of the concept of laminated elastomeric bearings to end bearings for articulating links and more particularly to articulating links connected to helicopter swash plate and scissors and sleeve assemblies.

Figure 1:
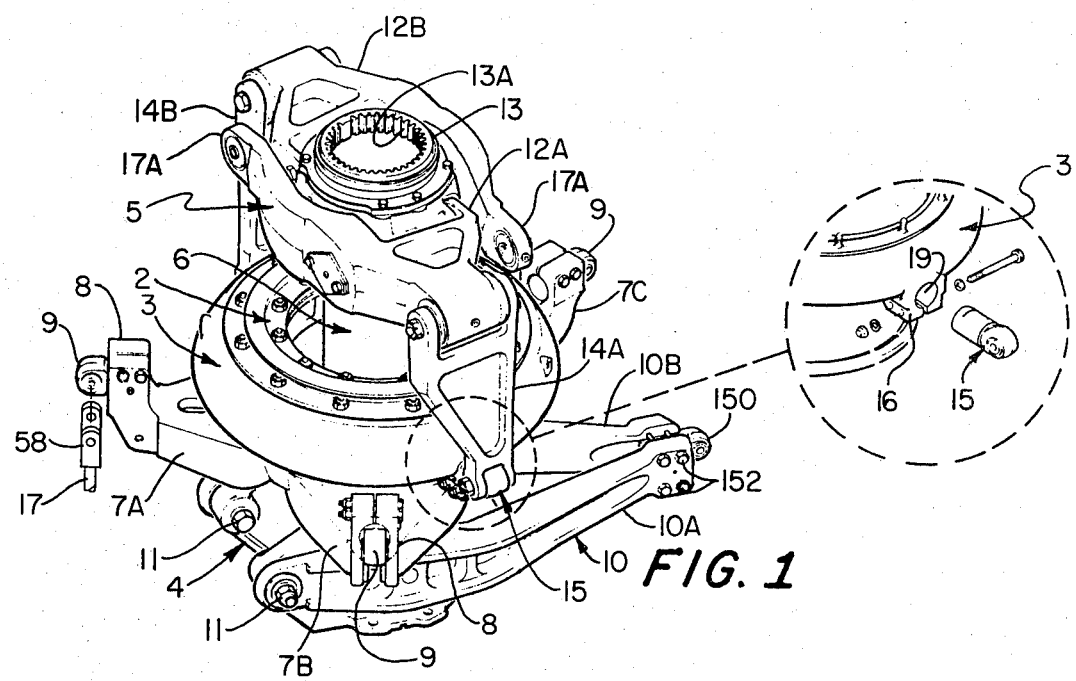
FIG. 1 is a perspective view of a helicopter swash plate-scissors and sleeve assembly with end bearing assemblies embodying the present invention.

Turning now to FIG. 1, there is shown a typical motion control and transmitting mechanism for the main rotor (not shown) of a helicopter. The mechanism comprises a swashplate and support assembly and a scissors and sleeve assembly which are adapted to be mounted around the mast of the main rotor and to transmit movements from cyclic and collective control systems mounted in the helicopter cabin and fuselage to linkages which rotate with the main rotor. The swash plate assembly comprises an inner ring subassembly 2 and an outer ring subassembly 3 carried by a support assembly 4. The scissors and sleeve assembly comprises a scissors assembly 5 and a sleeve assembly 6. The swash plate outer ring subassembly 3 is rotatable relative to inner ring subassembly 2, and the entire swash plate assembly is mounted to support assembly 4 by gimbal means (not shown) for universal tilt according to the position of the helicopter cyclic control stick as transmitted by drive links connected to swash plate inner ring subassembly 2. For this purpose the inner ring subassembly is formed with two arms 7A and 7B which are commonly referred to as the right and left horns respectively. Each of the horns terminates in a yoke 8 which is connected to the pilot-operated cyclic control stick (not shown) by a trunnion or bearing assembly 9 and a suitable link, usually in the form of a control rod as shown at 17. The swash plate inner ring subassembly also is formed with a third arm 7C which is commonly referred to as the "aft horn". Arm 7C also terminates in a yoke 8 carrying a trunnion or end bearing assembly 9 which is used to connect it to a control rod leading to a synchronized elevator control system, whereby the helicopter stabilizer is linked to the helicopter fore-aft control system.

The scissors and sleeve assembly moves vertically within the swashplate assembly, such movement being produced by a pilot-operated collective control stick (not shown) operatively connected and acting through a dual collective lever 10 which is pivotally attached at one end to support assembly 4 at 11 and also is pivotally secured to sleeve assembly 6 by means (not shown) extending through openings in support assembly 4. The sleeve assembly 6 surrounds the main rotor mast (not shown) and includes a drive plate 13 with an internal gear 13A that meshes with but is slidable axially along a splined section of the mast. The scissors assembly comprises two scissors members 12A and 12B which are pivotally mounted intermediate their ends to drive plate 13. One end of each scissors member is pivotally attached to a link 14 (A & B) which in turn is coupled by a trunnion or bearing assembly 15 to a yoke 16 forming part of the swash plate outer ring subassembly 3. The two yokes 16 carried by ring 3 are diametrically opposed. Each of the scissors members 12A and 12B has its opposite end 17A connected by a suitable link (not shown), usually in the form of a control rod to an upper linkage (not shown) which is mechanically coupled to the pitch horn (not shown) of one of the blades (not shown) of the main rotor. As is known to persons skilled in the art, the combined effect on the scissors members and upper linkage of the vertical movement of sleeve assembly 6 and tilting movement of the swash plate assembly determines the main rotor tilt and blade pitch. The specific design of the swash plate/scissors and sleeve mechanism forms no part of the present invention and it is to be understood that the several forms of bearings provided by the present invention may be used in combination with other forms of swash plate or scissors and sleeve assemblies, or with other mechanisms of like purpose, or with articulating rods or links of other mechanisms where loading and motion along or about one or more selected axes must be accommodated.

As seen in FIG. 1, the yokes 8 and 16 are generally alike and hence the following description of the yokes 8 applies equally to yokes 16. Each yoke 8 is split along a dividing line into two parts 8A and 8B (FIG. 3) that define an elongate opening or bore 19 (FIG. 1) for receiving one end of a rod end bearing assembly 9. In the particular swash plate assembly shown, the bores are cylindrical and the yokes 8 and 10 are formed so that the bores extend radially of the center axis of the swash plate assembly (i.e. the axis of the main rotor mechanism of which the swash plate assembly is part). Therefore in the usual case it is essential that the bearings 9 and 15 be designed so as to permit each operating rod or link coupled to a yoke 8 or 16 to have some pivotal movement about a pivot axis which is perpendicular to the axis of the yoke's bore 19, and also be capable of carrying predetermined loadings on the rod or link. It also may be essential or desirable that the operating rod be capable of limited motion about the axis of bore 19. The load-reacting requirements of bearings 9 and 15 depends on the normal angle between the yokes and the links connected thereto. In the embodiment of FIG. 1 the links 17 and 14 usually are approximately vertical and hence the bearings 9 and 15 are required to react loadings applied radially of the link pivot axis and approximately radially of the axis of bore 19. However, it is appreciated that the yokes or links may be arranged at a different angle requiring the end bearings to accommodate loading in a different direction. Thus, if the yokes were disposed so that bores 19 were vertical, or if the links were aligned with instead of at an angle to bore 19, the end bearing would have to be able to react axial loads. Accordingly, FIGS. 2–12 show different forms of end bearing assemblies for different loading-reacting and motion-accommodating applications.

Figure 2:
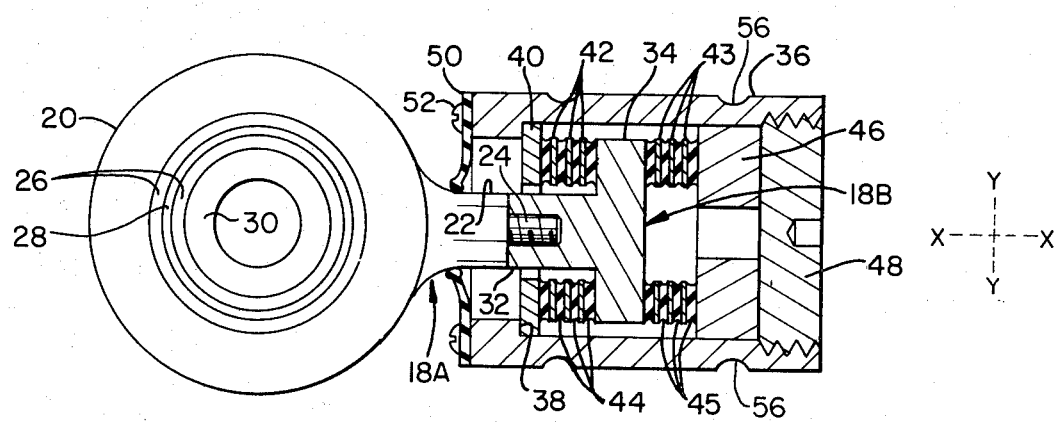
FIG. 2 is an enlarged scale sectional view of one form of rod end bearing assembly made in accordance with this invention.
Figure 3:
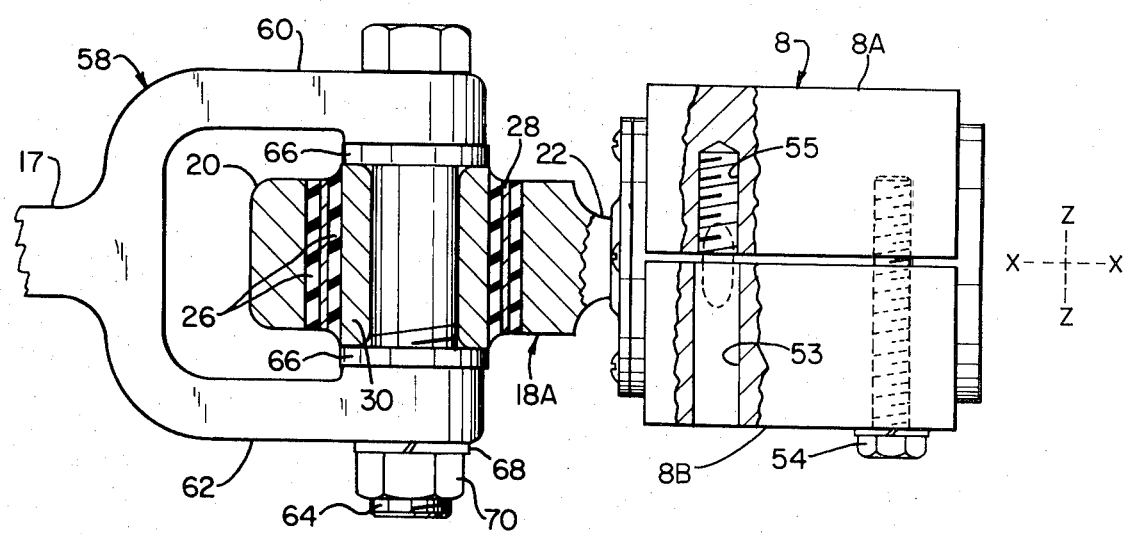
FIG. 3 is a view, partly in section, of the rod end bearing assembly of FIG. 2 rotated 90° and attached to a control link.

Turning now to FIGS. 2 and 3, there is shown a link end assembly or trunnion that is adapted to react loadings along the axis of bores 19 of yokes 8 and 16. This particular end bearing assembly, which may be used to attach a link to an outer or inner swash plate, essentially comprises a load-transmitting member which preferably is formed in two parts 18 (A and B). The part 18A is similar in general shape to an eye-bolt, comprising a cylindrical section 20 and a shank 22 which extends radially away from cylindrical section 20 and has a threaded reduced diameter end 24. The load-transmitting member is made of a suitable non-extensible material, typically a suitable high tension strength metal such as stainless steel, and mounted within the opening formed by the inner surface of its cylindrical section 20 is a laminated bearing construction consisting of a pair of cylindrical elastomer layers 26 separated by a cylindrical metal shim 28, and an inner cylindrical bearing member 30. The latter and also shim 28 are made of a suitable non-extensible material, preferably of the same materials as the load transmitting member. The elastomer layers, which preferably are made of a material or synthetic rubber but also may be made of a suitable plastic material, are bonded to the shim 28 and cylindrical members 20 and 30 so as to form a stable cylindrical laminated elastomeric bearing unit, with members 20 and 30 serving as its outer and inner races respectively.

As seen best in FIG. 2 the second part 18B of the load transmitting member is essentially t-shaped, comprising a stem section 32 and a peripheral flange 34. Stem section 32 has a tapped hole into which is screwed the threaded end of 24 of part 18A. This second part 18B of the load transmitting member is disposed within a cylindrical housing 36 which is open at both ends and is formed with an internal shoulder 38 which acts as a stop for an annular metal ring 40. The load transmitting part 18B forms part of a laminated elastomeric thrust rod bearing comprising two laminated sections. One laminated section is disposed between the flange 34 and ring 40 and comprises alternating annular layers of metal shims 42 and elastomer material 44 bonded to each other as well as to flange 34 and ring 40. The second laminated bearing section comprises metal shims 43 disposed in alternating rotation with elastomer layers 45, with the latter being bonded to the shims, flange 34 and also an end ring 46 which is held in place by an end plug 48 screwed into the back end of the housing. A resilient dust and moisture cover 50, preferably made of rubber, surrounds shank 22 of the first part 18A of the load transmitting member and is secured by suitable means, e.g., screws 52, to the front end of the housing.

The housing 36 is inserted into bore 19 of a yoke 8 or 16 and held in place by clamping the yoke tightly about it by means of bolts 54 which extend through openings 53 in one half of the yoke and are received in tapped holes 55 in the other half. Additionally the housing is formed with transverse grooves 56 in its outer surface, and the yoke is adapted so that portions of bolts 54 reside in grooves 56 and engage the housing at those regions, whereby the bolts prevent housing 36 from rotating or moving axially relative to the yoke. A control rod 17 is coupled to the part 18A of the load member by a conventional clevis 58 which may be formed as an integral part of the rod or else formed separately and affixed to the rod by a suitable means, e.g. by welding or a pin or screw connection. The two arms 60 and 62 of the clevis are provided with aligned openings through which extends a bolt 64. Flat washers 66 are sandwiched between the two clevis arms and the flat end faces of the inner bearing member 30 and a lock washer 68 and a nut 70 coact with bolt 64 to clamp the clevis and washers to the inner race 30 of the cylindrical bearing unit, whereby the clevis is fixed at a selected angle about the axis of bolt 64 and is incapable of rotation relative to inner face 30.

The load-reacting and motion-accommodating capabilities of the rod end bearing assembly of FIGS. 2 and 3 (and also of the designs shown in FIGS. 4–12) may be appreciated by associating the assembly with three mutually orthogonal axes, x-x, y-y, and z-z, where x-x extends parallel to the center axis of the load transmitting member 18 (A and B), y-y extends transversely of housing 36, and z-z extends parallel to the center axis of annular bearing member 30.

As is believed obvious to a person skilled in the art, the cylindrical laminated bearing unit carried by the part 18A of the load transmitting member is capable of resisting and supporting loads applied radially of members 20, 26, 28 and 30, in particular such loads applied lengthwise of control rod 17. At the same time the cylindrical bearing unit carried by the part 18A of the load transmitting member permits the rod to pivot to a limited extent about the center axis of cylindrical bearing member 20, i.e., about axis z-z since the elastomer layers 26 are capable of yielding in shear. In any event the cylindrical bearing carried by part 18A and the laminated bearing construction connecting part 18B and housing 36 coact to enable the rod end bearing assembly to support and react to loadings applied along the x-x axis since the lamellae at both ends of the load transmitting member are loaded in compression (in this connection it should be noted that the compression loading an lamellae 42 and 44 varies inversely with the compression loading on lamellae 43 and 44). The laminated bearing construction connecting part 18B to the housing also is capable of yielding in shear to accommodate a limited torsional motion, i.e., motion about axis x-x.

As noted previously the laminated cylindrical bearing unit comprising members 20, 26, 28 and 30 is capable of some pivotal movement about the z-z axis since the elastomer layers 26 are capable of yielding in shear. Typically the cylindrical bearing may be designed so that the elastomer layers will accommodate relative rotation between members 20 and 30 about the z-z axis amounting to about ±10° from their at-rest position, i.e., the position where the elastomer members are free of shear stress. Hence the pivoting action of link 17 must be kept within limits determined by the shear stress properties of the elastomer layers 26. Fortunately the required amount of pivotal movement between swash plates and control rods such as shown at 17 usually is relatively small, typically about ±5°, well within the motion-accommodating capability that can be achieved with cylindrical laminated bearing units as shown in FIGS. 2 and 3.

Of course it is understood that there may be instances where the clevis may be connected so that it is freely rotatable on bolt 64 relative to inner race 30, in which case the elastomer bearing unit serves to assure limited pivotal motion of the control rod in the event the clevis becomes bound to inner bearing member 30.

FIG. 4 illustrates a modification of the rod end bearing assembly of FIGS. 2 and 3 which eliminates the need for cover 50. In this case the load transmitting member 18 is one piece and the shoulder 38 for end ring 40 is provided by an annular collar consisting of two matching halves 72A and B having lips 74 that fit into a peripheral groove in the front end of housing 36. Screws 76 lock parts 72A and B to the housing. The inner surfaces of collar halves 72A and B are spaced from shank 22 and are formed with a groove to accommodate an O ring 78 that tightly engages shank 22. The O-ring acts as a dust and moisture barrier while allowing the load transmitting parts 18A and B to move relative to housing 36 to the extent permitted by the laminated bearing construction within the housing. This arrangement allows the laminated elastomer bearing construction bonded to flange 34 and rings 40 and 46 to the preassembled as a unit and inserted into the housing via its fron end.

FIG. 5 illustrates a construction similar to that of FIGS. 2 and 3 which allows motion about three mutually perpendicular axes. In this case the inner surfaces of end rings 40A and 46A are spherically curved instead of being flat. Additionally the opposite surfaces of flange 34A and the non-extensible and elastomer lamellae 42A, 43A and 44A and 45A, are all spherically curved. As a consequence the laminated spherically curved bearing construction is capable of supporting and reacting loads applied along the x-x axis and accommodating motion about that axis and also about the y-y axis, while the cylindrical bearing unit carried by part 18A is capable of reacting loads applied along the x-x axis and accommodating motion about the z-z axis.

FIG. 5 may also be considered as an illustration of a further modification of the invention in which the spherical surfaces of members 34A, 40A, 42A, 43A, 44A, 45A and 46A are replaced by aligned cylindrical surfaces, so that the foregoing surfaces would appear flat in a sectional view displaced 90° around the axis of housing 36 from FIG. 5. With cylindrical surfaces, the assembly would still have a load-reacting capability along the x-x axis but its motion-accommodating capability would be limited to motion about the x-x and z-z axes.

FIG. 6 illustrates a rod end bearing assembly which incorporates a different O-ring support and is designed to react loads along the y-y axis. Hence it may be used as the bearing 9 or 15 in the apparatus of FIG. 1. In this design the front end of housing 36A is threaded to receive a one-piece annular collar 70 which is grooved to carry an O-ring 78 that surrounds and engages shank 22 of load transmitting member 18A. The second part 18C of the load transmitting member is a cylindrical rod which is surrounded by cylindrical metal shims 90 and 92 and intervening bonded cylindrical layers 94 of a suitable elastomer. Shim 92 makes a close fit with housing 90 and preferably is bonded to it by a suitable cement. An end plug 48A is screwed into the back end of the housing and acts to force shim 92 tight against collar 70. This particular unit is capable of accommodating movement of the load transmitting member about its own (the x-x) axis while reacting to loads applied along the y-y coordinate axis.

Figure 7:
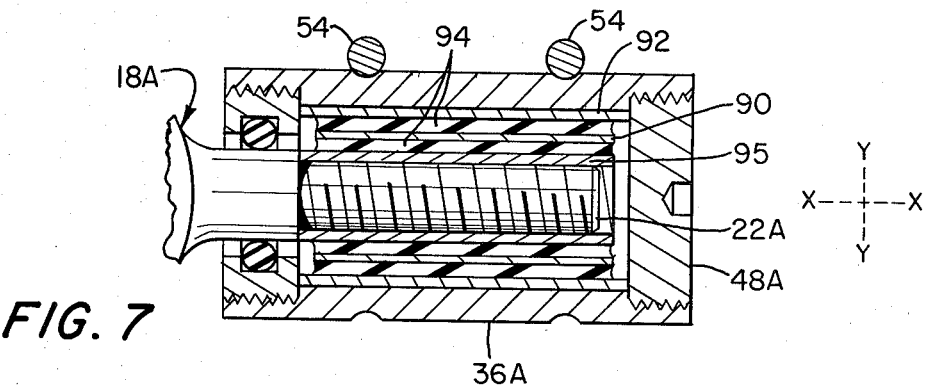

FIG. 7 shows a unit similar to the one shown in FIG. 6 except that the load transmitting member 18 is one-piece and has a shank 22A which is secured to a metal shim 95 bonded to elastomer layer 94. Shank 22A may be secured to shim 95 by welding or cementing, a friction grip fit, or by a threaded connection as shown. The latter facilitates attachment of the load-transmitting member after the shims 90, 92 and 95 have been bonded to elastomer layers 94.

Figure 8:
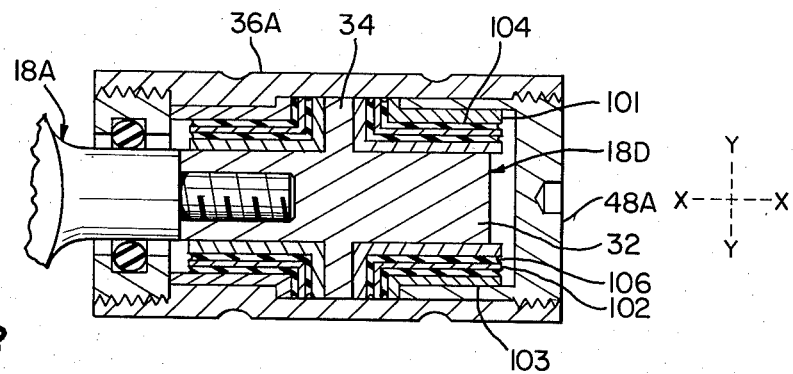
Figure 9:
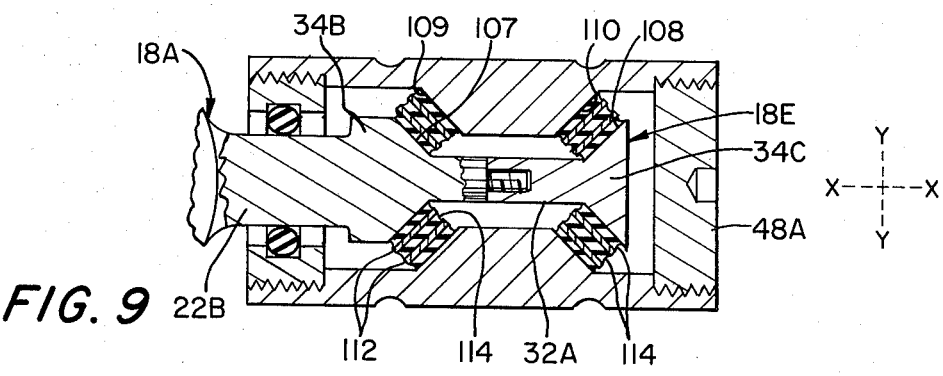

FIGS. 8 and 9 show two designs which are designed to support loads along the x-x and y-y axes and hence are preferred for use in the apparatus of FIG. 1. In FIG. 8 the flange 34 of the second part 18D of the load transmitting member is located between the ends of stem 32, and the laminated bearing unit carried by that stem comprises metal shims 101, 102 and 103 and elastomer layers 104 and 106 that comprise cylindrical portions concentric with the stem and annular portions parallel with flange 34. Housing 36A, flange 34, stem 32 and the intervening shims are bonded to elastomer layers 104 and 106, whereby the resulting laminated construction is capable of reacting to loads along the x-x axis due to its radially-extending sections and also of reacting to loads along the y-y axis due to its cylindrical sections. In FIG. 9, the two parts 18A and 18E of the load transmitting member comprise respectively a shank 22B and a stem 32A formed with flanges 34B and 34C having conically tapered surfaces 107 and 108, and housing 36C is formed with a pair of conically tapered shoulders 109 and 110. A conically tapered laminated elastomeric bearing construction made up of metal shims 112 intercalated with elastomer layers 114 is disposed between and bonded to surface 107 and shoulder 109, and a second like laminated construction is similarly disposed between and bonded to surface 108 and shoulder 110. As a consequence the frusto-conical laminated bearings are capable of supporting the reacting to loads applied along both the x-x and y-x axes and accommodating motion about the x-x axis.

Figure 10:
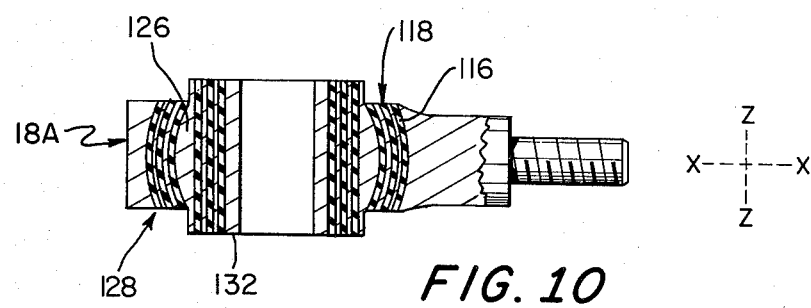

FIG. 10 illustrates a modification of the laminated bearing unit carried by the outer end of the load transmitting member. In this case the outer load transmitting member 18A is formed with an opening at its outer end defined by a spherically curved surface 116 in which is secured a laminated spherical bearing section 118 consisting of a plurality of alternating metal shims and elastomer layers which are concentric about an axis z-z perpendicular to the longitudinal x-x axis of member 18A and are spherically curved in cross-section. The innermost elastomer layer is bonded to the spherically curved outer surface of an annulus 126 having a cylindrical inner surface which is bonded to and forms part of a cylindrical laminated bearing section 128. The latter consists of an inner bearing cylinder 132 spaced from and secured to annulus 126 by a plurality of concentric cylindrical shims and intervening adherent cylindrical elastomer layers. This outer dual laminated elastomer bearing construction may be embodied in the outer end of the load transmitting member 18 of any of the bearing assemblies disclosed in FIGS. 2–9. The design of FIG. 10 offers the advantage that it reacts to loads along the x-x axis, while the inner cylindrical bearing section 128 accommodates motion about the z-z axis and the outer spherical bearing section 118 accommodates motion about an axis y-y which is perpendicular to both of the other two axes.

FIG. 11 discloses another form of laminated bearing design that may be provided at the outer end of the load transmitting member in place of the cylindrical bearing unit of FIGS. 2–9 consisting of members 20, 26, 28 and 30. In this case the opening in the annular outer end 20A of the load-transmitting member 18A is counterbored at each end and the cylindrical members 26, 28 and 30 are replaced by corresponding cylindrical members 26A, 28A and 30 that have radially-extending outer flanges at each end that extend into the two counterbores. As a consequence the resulting laminated bearing unit is capable of reacting to loads applied both radially and axially of axis z-z as well as accommodating motion about that same axis.

FIG. 12 shows a further modification of the invention which is similar in many respect to the bearing assembly of FIG. 2. In this case the end rings 40 and 46 are omitted and instead the laminated bearing construction on opposite sides of flange 34 is attached directly to collar 70 and plug 48B. Additionally plug 48B is adapted to act as a second load transmitting member, being formed with a shank 130 having a cylindrical termination 132 similar to but displaced 90° from the cylindrical end 20 of part 18A. Cylindrical termination 132 forms part of a second cylindrical laminated elastomer bearing unit which also consists of an inner cylindrical bearing member 136 and cylindrical metal shims 138 bonded to one another and termination 132 by intervening adherent elastomer layers 140. While this multiple bearing assembly is not suitable for connecting a swash plate to a control rod 8, it does have application where it is necessary to support and react to loads along the x-x axis while accommodating motion about that axis and also the y-y and z-z axes. The laminated bearing within housing 36A allows limited motion about the x-x axis, while the cylindrical bearing unit carried by part 18A allows motion about the z-z axis and the bearing unit carried by shank 130 accommodates motion about the y-y axis.

Obviously it also is possible to combine features of the foregoing designs in ways not already described. Hence the embodiment of FIG. 11 may be used with a spherical bearing as shown in FIG. 5 or a frustoconical bearing as shown in FIG. 9. The bearing of FIG. 11 also may be modified so that the laminates are spherically or frustoconically shaped in cross-section. Also the designs of, for example, FIGS. 2, 5, 6, 8 and 9 may be modified by making the load-transmitting member in one-piece. A further obvious change is to modify the housing 36 so that it may be secured to the swash plate assembly by means other than a yoke as shown, e.g., the housing and bore 19 of the yoke could be threaded so that the housing could be screwed into the yoke, or the housing could be provided with flanges or ears whereby it could be bolted directly to the swash plate assembly. Another obvious change is to vary the number of shims and elastomer layers in each bearing unit. It should be understood also that cover 50 or collars 70 and O-rings 78 may be omitted for many applications since laminated elastomeric bearings have greater resistance to degradation and failure from entrapped dirt and moisture than all-metal bearings.

It is to be appreciated that the links 14A and 14B have clevis-like ends which may be secured to cylindrical laminated bearing units carried by member 8A in the same manner as the clevis 58 in FIG. 3. Bearing assemblies made as herein described also may be used to connect a control link to the dual collective lever 10 as shown by the bearing 150. The free ends of the two members 10A and 10B of collective lever 10 form a yoke adapted to accommodate and grip the housing 36 of a bearing assembly, with bolts 152 functioning the same as bolts 57.

The invention as herein described has many advantages, of which the principal one is that end bearings of selected compressive and torsional loading-reacting characteristics and selected motion-accommodating capabilities can be provided to meet the requirements of different articulating mechanisms. Still another advantage is that the elastomer components of the end bearings tend to damp vibrations and thus help reduce noise as well as vibration-induced wear and stresses. Also they have a positive restoring force and thus zero backlash, thereby contributing to greater pilot "feel" for the controls of the aircraft. A further advantage is that the end bearings can be used in non-helicopter mechanisms, e.g., to connect control rods in aircraft, submarines, motor vehicles and industrial equipment. Also the end bearing assemblies can be built in modular form, e.g. the bearing structures within housings 36 can be preassembled outside of the housings and separately of the bearing structure carried by the part 18A. Still other advantages will be obvious to persons skilled in the art.

What is claimed is:

1. A rod end bearing assembly for coupling a connecting rod to a mechanical element comprising:
    a first laminated elastomeric bearing unit comprising alternating elastomer and non-elastomer layers of cylindrical shape;
    a second laminated elastomeric bearing unit comprising alternating elastomer and non-elastomer layers of non-cylindrical shape; and
    a load transmitting member extending between and connected to said first and second elastomeric bearing units;
    said first bearing unit being adapted to accommodate motion about the first of three predetermined axes and to react loading along the second or third of said three axes, said second bearing unit being adapted to react loading along said second axis and to accommodate motion about said second axis, and said load transmitting member having a longitudinal axis extending radially of the elastomer and non-elastomer layer of said first bearing unit and at an angle to the elastomer and non-elastomer layers of said second bearing unit.

2. A rod end bearing assembly according to claim 1 wherein said first bearing unit comprises first and second cylindrical members and a laminate therebetween comprising at least one cylindrical non-elastomer layer bonded to at least two cylindrical elastomer layers.

3. A rod end bearing assembly according to claim 1 wherein said second bearing unit comprises a laminate having at least one annular metal layer bonded to at least two annular elastomer layers.

4. A rod end bearing assembly according to claim 1 wherein said second bearing assembly comprises at least two laminates each having at least one non-elastomer layer and at least two elastomer layers.

5. A rod end bearing assembly according to claim 4 wherein said at least two laminates are disposed so that they reinforce one another with respect to loadings applied along the longitudinal axis of said load transmitting member.

6. A rod end bearing assembly according to claim 4 wherein each laminate of said second bearing unit comprises annular metal layers.

7. A rod end bearing assembly according to claim 4 wherein each laminate of said second bearing unit comprises conically tapered layers.

8. A rod end bearing assembly according to claim 4 wherein each laminate of said second bearing unit comprises layers having a first annular section and a second cylindrical section.

9. A rod end bearing assembly according to claim 4 wherein each laminate of said second bearing unit comprises layers having a cylindrical shape in part.

10. A rod end bearing assembly according to claim 4 wherein said first bearing unit comprises concentric spherically shaped alternately-disposed non-elastomer layers and elastomer layers.

11. A rod end bearing assembly according to claim 4 wherein said second bearing unit comprises a tubular housing, said first bearing unit is adapted to accommodate motion about an axis which is at a right angle to the axis of said tubular housing, and said load transmitting member comprises two mating parts, with one part bonded to and forming an integral element of said first bearing unit and the other part bonded to and forming an integral element of said second bearing unit.

12. A rod end bearing assembly according to claim 4 wherein said second bearing unit comprises a hollow housing and is adapted to (a) react loading applied lengthwise of said housing and (b) accommodate motion about the axis of said housing.

13. A rod end bearing assembly according to claim 1 wherein said first bearing unit is connected to a link and said second bearing unit is connected to a swash plate.

14. A rod end bearing assembly according to claim 1 wherein said first bearing unit is connected to a link and said second bearing unit is connected to a collective lever assembly that is adapted to operate a scissors and sleeve assembly.

15. A rod end bearing assembly according to claim 1 wherein at least some of the layers of said second bearing unit are rings with curved surfaces.

16. A rod end bearing assembly according to claim 15 wherein the layers of said second bearing unit have spherically curved surfaces.

17. A rod end bearing according to claim 1 wherein said first bearing unit is adapted to react loading along the second and third of said three axes.

18. A rod end bearing assembly for coupling a connecting rod to a mechanical element comprising:
a first laminated elastomeric bearing unit;
a second laminated elastomeric bearing unit; and
a load transmitting member extending between and connected to said first and second elastomeric bearing units;
said first bearing unit being adapted to accommodate motion about the first of three predetermined axes and to react loading along at least one of the second and third of said three axes, said second bearing unit being adapted to react loading along said first axis and to accommodate motion about at least one of the other two of said three axes, and said load transmitting member comprising first and second separately formed elements attached to one another after formation thereof, said first element being an inner portion of said first bearing unit and said second element being an inner portion of said second bearing unit.

19. A rod end bearing assembly according to claim 18 wherein said second bearing unit comprises a tubular housing and said first element intrudes into said housing.

20. A rod end bearing assembly according to claim 18 wherein said first element intrudes into a portion of said second bearing unit.

21. A rod end bearing assembly according to claim 18 wherein said second bearing unit comprises elastomer and non-elastomer layers each having first and second portions with said first portion extending parallel to a selected one of said three axes and said second portion extending at an angle to said one selected axis.

22. A rod end bearing assembly according to claim 18 wherein said first bearing unit has elastomer and non-elastomer layers with said layers each comprising cylindrical and annular portions.

23. A rod end bearing assembly according to claim 22 wherein the layers of said first bearing unit comprise first and second annular portions connected by cylindrical portions.

24. A rod end bearing assembly for coupling a connecting rod to a mechanical element comprising:
a first laminated elastomeric bearing unit;
a second laminated elastomeric bearing unit; and
a load transmitting member extending between and connected to said first and second elastomeric bearing units;
at least one of said bearing units being adapted to accommodate motion about the first and second of three predetermined axes and to react loading along the third of said three axes.

25. A rod end bearing assembly according to claim 24 wherein the other bearing unit is adapted to react loading along one of said first and second axes.

26. A rod end bearing assembly according to claim 25 wherein said other bearing unit comprises first and second cylindrical members and a laminate therebetween comprising at least one cylindrical non-elastomer shim bonded to at least two cylindrical elastomer layers.

27. A rod end bearing assembly according to claim 25 wherein said other bearing unit comprises a single laminate having at least one metal layer bonded to at least two elastomer layers.

28. A rod end bearing assembly according to claim 25 wherein said other bearing assembly comprises at least two laminates each having at least one metal layer and at least two elastomer layers, said two laminates being disposed so that they reinforce one another with respect to loadings applied along the longitudinal axis of said load transmitting member.

29. A rod end bearing assembly according to claim 24 wherein said one bearing unit comprises at least two laminates, with one laminate surrounding the other laminate and each laminate having at least one non-elastomer layer and at least one elastomer layer.

30. A rod end bearing assembly according to claim 24 wherein at least one of said bearing units has elastomer and non-elastomer layers inclined to one of said three axis.

31. A rod end bearing assembly according to claim 24 wherein at least one of said bearing units comprises angulated elastomer and non-elastomer layers.

32. A rod end bearing assembly for coupling a connecting load to a mechanical element comprising:
first and second laminated elastomeric bearing units and a load transmitting member extending between and connected to said first and second elastomeric bearing units, at least one of said bearing units being adapted to react loading along the first and second of three predetermined axes and to accommodate motion about the third of said three axes, and the other of said bearing units being adapted to accommodate motion about one of said first and second axes.

33. In a helicopter system the combination of:
a swash plate assembly;
a rod for transmitting motion between a selected mechanism and said swash plate assembly; and
a laminated elastomeric rod end bearing assembly connecting said rod to said swash plate assembly;
said rod end bearing assembly comprising a first laminated elastomeric bearing unit connected to said rod, a second elastomeric bearing unit connected to said swash plate assembly, and a load-transmitting member extending between and having first and second ends connected to said first and second elastomeric bearing units;
said first bearing unit comprising a first tubular section attached to said first end of said load transmitting member, a second tubular section surrounded by said first tubular section and attached to said rod, at least one tubular non-elastomer layer disposed between said first and second tubular sections, and elastomer layers intercalated between and bonded to said at least one non-elastomer layer and said first and second tubular sections; and
said second bearing unit comprising a tubular housing surrounding and spaced from said second end of said load transmitting member, and a laminate comprising at least one non-elastomer shim and at least two elastomer layers bonded together in alternate layers, said laminate being disposed between and secured to said housing and said second end of said load transmitting member.

34. The combination of claim 33 wherein said rod and said first laminated elastomeric bearing unit are connected together by a bolt and clevis, with said clevis attached to said rod and said bolt extending through said second tubular section and serving to retain said clevis to said first bearing unit.

35. The combination of claim 33 wherein said first and second tubular sections are concentric about an axis which is at a right angle to the axis of said tubular housing.

36. The combination of claim 35 wherein said laminate comprises flat annular shims.

37. The combination of claim 35 wherein said laminate comprises spherically curved annular shims.

38. The combination of claim 35 wherein said laminate comprises cylindrically curved annular shims.

39. The combination of claim 35 wherein said laminate comprises cylindrical shims.

40. The combination of claim 35 wherein said laminate comprises shims which have a first cylindrical portion and a second annular portion.

41. The combination of claim 35 wherein said laminate comprises conically tapered annular shims.

42. The combination of claim 33 wherein said first tubular section has a spherically curved inner surface, at least one of said non-elastomer layers has a spherically curved outer surface, and said spherically shaped inner and outer surfaces are separated by and bonded to a spherically curved elastomer layer.

43. The combination of claim 33 wherein said first bearing unit is adapted to react loading applied radially of the common axis of said first and second tubular sections and said second bearing unit is adapted to react loading applied along the axis of said tubular housing.

44. The combination of claim 33 wherein said second bearing unit is adapted to react loading applied radially of the axis of said tubular housing and to accommodate motion about the same axis.

45. The combination of claim 44 wherein said second bearing is adapted to react loading applied along the axis of said tubular housing.

46. The combination of claim 33 wherein said first bearing unit is connected to accommodate movement of said rod about the axis of said first tubular section and to react to loading by said rod applied radially of said axis.

47. The combination of claim 33 wherein said second end of said load transmitting member has a peripheral flange, a shoulder fixed with respect to said housing is provided within said housing, and said at least one shim and said elastomer layers are disposed between said flange and said shoulder.

48. The combination of claim 47 wherein a second shoulder fixed with respect to said housing is provided within said housing, and a second laminate comprising at least one shim and at least two elastomer layers is disposed between and attached to said second shoulder and said flange.

49. The combination of claim 33 wherein said load transmitting member has first and second shoulders at or adjacent to said second end thereof, and further including a second laminate comprising at least one non-elastomer shim and at least two elastomer layers bonded together in alternate layers, and third and fourth shoulders disposed within and fixed with respect to said housing; said first laminate being disposed between and bonded to said first and third shoulders and said second laminate being disposed between and bonded to said second and fourth shoulders.

50. The combination of claim 49 wherein each of said laminates comprises flat annular shims.

51. The combination of claim 49 wherein each of said laminates comprises conically tapered annular shims.

52. The combination of claim 49 wherein each of said laminates comprises shims having a cylindrical section and an annular section.

* * * * *

UNITED STATES PATENT AND TRADEMARK OFFICE
CERTIFICATE OF CORRECTION

PATENT NO. : 4,232,563

DATED : November 11, 1980

INVENTOR(S) : Robert R. Peterson, Daniel S. Ventura & Richard S. Gureghian

It is certified that error appears in the above-identified patent and that said Letters Patent are hereby corrected as shown below:

Column 1, line 26    Delete the word "linkeage" and substitute therefor "linkage"..

Column 3, line 9    Delete the word "linkeage" and substitute therefor "linkage".

Column 3, line 57    Delete the word "linkeage" and substitute therefor "linkage".

Column 6, line 5    Delete the word "an" and substitute "on".

Column 6, line 53    Delete the word "the" in the first instance and substitute "be".

Column 6, line 54    Delete the word "fron" and substitute therefor "front".

Column 7, line 68    Delete the word "the" and substitute therefor "and".

Column 8, line 1    Delete "y-x" and substitute therefor "y-y".

Column 8, line 45    Delete the word "respect" and substitute therefor "respects".

Signed and Sealed this

Twenty-fourth Day of March 1981

[SEAL]

Attest:

RENE D. TEGTMEYER

Attesting Officer      Acting Commissioner of Patents and Trademarks